United States Patent
Huang et al.

(10) Patent No.: US 9,641,096 B2
(45) Date of Patent: May 2, 2017

(54) ENERGY-SAVING POWER SUPPLY APPARATUS

(71) Applicant: Chicony Power Technology Co., Ltd., New Taipei (TW)

(72) Inventors: Wen-Nan Huang, New Taipei (TW); Shiu-Hui Lee, New Taipei (TW); Chih-Ming Yu, New Taipei (TW); Hsin-Chang Yu, New Taipei (TW); Jhen-Siang Huang, New Taipei (TW); Ming-Chieh Cheng, New Taipei (TW); Chang-Li Hsieh, New Taipei (TW); Jung-Shan Hsieh, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 51 days.

(21) Appl. No.: 14/754,063

(22) Filed: Jun. 29, 2015

(65) Prior Publication Data

US 2016/0380553 A1    Dec. 29, 2016

(51) Int. Cl.
H02M 7/217 (2006.01)
H02M 1/00 (2006.01)
H02M 1/08 (2006.01)

(52) U.S. Cl.
CPC ............ H02M 7/217 (2013.01); H02M 1/00 (2013.01); H02M 1/08 (2013.01); H02M 2001/0048 (2013.01)

(58) Field of Classification Search
CPC ................................ H02M 1/42; H02M 7/217

USPC .......................................................... 363/89
See application file for complete search history.

(56) References Cited

U.S. PATENT DOCUMENTS

| | | | |
|---|---|---|---|
| 2003/0095423 A1 | 5/2003 | Hirst | |
| 2007/0170903 A1 | 7/2007 | Apfel | |
| 2008/0031014 A1* | 2/2008 | Young ................. | H02M 1/4225 363/16 |
| 2011/0199799 A1 | 8/2011 | Hui et al. | |
| 2012/0307537 A1* | 12/2012 | Ramorini .............. | B60C 23/041 363/126 |
| 2016/0065061 A1* | 3/2016 | Tsyrganovich ....... | H02M 3/156 323/312 |

FOREIGN PATENT DOCUMENTS

| | | |
|---|---|---|
| CN | 104218824 A | 12/2014 |
| TW | 522623 B | 3/2003 |
| TW | I461881 B | 11/2014 |
| TW | M507115 U | 8/2015 |

\* cited by examiner

*Primary Examiner* — Jue Zhang
*Assistant Examiner* — Trinh Dang
(74) *Attorney, Agent, or Firm* — Muncy, Geissler, Olds & Lowe, P.C.

(57) ABSTRACT

An energy-saving power supply apparatus includes a bridge rectifier, a diode bypass circuit and a control circuit. The diode bypass circuit is electrically connected to the bridge rectifier. The control circuit is electrically connected to the diode bypass circuit and the bridge rectifier. The bridge rectifier includes a plurality of diodes. After the control circuit receives a power start signal, the control circuit is configured to control the diode bypass circuit, so that a part of the diodes are bypassed to save energy.

7 Claims, 2 Drawing Sheets

ENERGY-SAVING POWER SUPPLY APPARATUS

BACKGROUND OF THE INVENTION

Field of the Invention

The present invention relates to a power supply apparatus, and especially relates to an energy-saving power supply apparatus.

Description of the Related Art

The power supply apparatus is a very common electronic apparatus. The power supply apparatus is used to supply power to the load apparatus to drive the load apparatus. Therefore, the power supply apparatus is very important. Usually, the power supply apparatus is connected to the alternating current power supply apparatus to receive the alternating current power.

The inrush current is easily generated when the alternating current power supply apparatus or the load apparatus are just started. Therefore, the power supply apparatus usually comprises the negative temperature coefficient thermistor to suppress the inrush current. When the alternating current power supply apparatus or the load apparatus are just started, the temperature of the negative temperature coefficient thermistor is low, so that the impedance of the negative temperature coefficient thermistor is high to suppress the inrush current. The diodes of the bridge rectifier of the power supply apparatus are used to limit the direction of the current. Therefore, the diodes of the bridge rectifier of the power supply apparatus play important roles for suppressing the inrush current as well.

When there is no risk of the inrush current, the diodes of the bridge rectifier of the power supply apparatus, even the negative temperature coefficient thermistor, will consume mass energy. This problem needs to be resolved to save energy.

SUMMARY OF THE INVENTION

In order to solve the above-mentioned problems, an object of the present invention is to provide an energy-saving power supply apparatus.

In order to achieve the object of the present invention mentioned above, the energy-saving power supply apparatus comprises a bridge rectifier, a diode bypass circuit and a control circuit. The diode bypass circuit is electrically connected to the bridge rectifier. The control circuit is electrically connected to the diode bypass circuit and the bridge rectifier. The bridge rectifier comprises a plurality of diodes. After the control circuit receives a power start signal, the control circuit is configured to control the diode bypass circuit, so that a part of the diodes are bypassed to save energy.

The advantage of the present invention is that after the control circuit receives the power start signal (no risk of the inrush current at this time), the control circuit is configured to control the diode bypass circuit, so that a part of the diodes of the bridge rectifier are bypassed to save energy.

DETAILED DESCRIPTION OF THE INVENTION

Please refer to following detailed description and figures for the technical content of the present invention. The following detailed description and figures are referred for the present invention, but the present invention is not limited to it.

Figure 1:
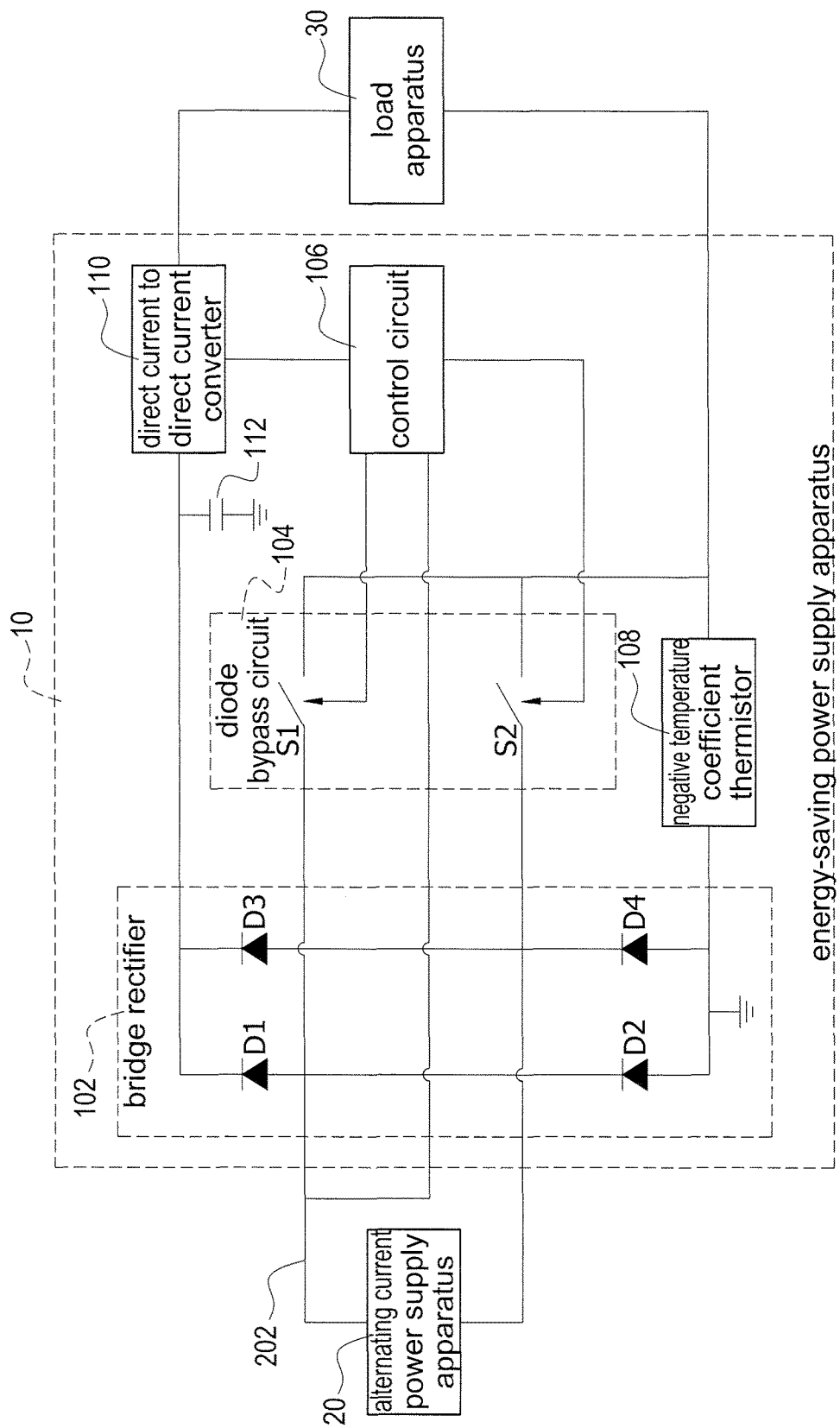
FIG. 1 shows a block diagram of the first embodiment of the energy-saving power supply apparatus of the present invention.

FIG. 1 shows a block diagram of the first embodiment of the energy-saving power supply apparatus of the present invention. An energy-saving power supply apparatus 10 is applied to an alternating current power supply apparatus 20 and a load apparatus 30. The energy-saving power supply apparatus 10 comprises a bridge rectifier 102, a diode bypass circuit 104, a control circuit 106, a negative temperature coefficient thermistor 108, a direct current to direct current converter 110 and a filtering capacitor 112. The bridge rectifier 102 comprises a plurality of diodes. Namely, the bridge rectifier 102 comprises a first diode D1, a second diode D2, a third diode D3 and a fourth diode D4. The diode bypass circuit 104 comprises a first switch S1 and a second switch S2.

The diode bypass circuit 104 is electrically connected to the bridge rectifier 102. The control circuit 106 is electrically connected to the diode bypass circuit 104 and the bridge rectifier 102. The negative temperature coefficient thermistor 108 is electrically connected to the diode bypass circuit 104 and the bridge rectifier 102. The direct current to direct current converter 110 is electrically connected to the bridge rectifier 102 and the control circuit 106. The filtering capacitor 112 is electrically connected to the bridge rectifier 102 and the direct current to direct current converter 110.

The first diode D1 is electrically connected to the diode bypass circuit 104 and the control circuit 106. The second diode D2 is electrically connected to the diode bypass circuit 104, the control circuit 106 and the first diode D1. The third diode D3 is electrically connected to the diode bypass circuit 104 and the first diode D1. The fourth diode D4 is electrically connected to the diode bypass circuit 104, the second diode D2 and the third diode D3. The first switch S1 is electrically connected to the bridge rectifier 102 and the control circuit 106. The second switch S2 is electrically connected to the bridge rectifier 102, the control circuit 106 and the first switch S1.

After the control circuit 106 receives a power start signal (no risk of the inrush current at this time), the control circuit 106 is configured to control the diode bypass circuit 104, so that a part of the diodes (for examples, the second diode D2 or the fourth diode D4) are bypassed to save energy. This will be described in details later. Moreover, the power start signal means that the direct current to direct current converter 110 starts working (no risk of the inrush current at this time).

When the alternating current power supply apparatus 20 or the load apparatus 30 are just started (the inrush current is easily generated at this time), the first switch S1 and the second switch S2 are turned off, so that a power 202 supplied by the alternating current power supply apparatus 20 flows through the negative temperature coefficient thermistor 108 to suppress the inrush current. Because the temperature of the negative temperature coefficient thermistor 108 is low, the impedance of the negative temperature coefficient thermistor 108 is high to suppress the inrush current.

At this time, a path of a positive half cycle of the power 202 is: the first diode D1, the direct current to direct current converter 110, the load apparatus 30, the negative temperature coefficient thermistor 108, the fourth diode D4 and the alternating current power supply apparatus 20. A path of a negative half cycle of the power 202 is: the third diode D3, the direct current to direct current converter 110, the load apparatus 30, the negative temperature coefficient thermistor 108, the second diode D2 and the alternating current power supply apparatus 20.

The power start signal can come from a pulse width modulation controller (not shown in FIG. 1) of the direct current to direct current converter 110 or can come from the alternating current power supply apparatus 20. After the control circuit 106 receives the power start signal (no risk of the inrush current at this time):

The control circuit 106 is configured to turn on the second switch S2 and turn off the first switch S1 in the positive half cycle of the power 202. At this time, the path of the positive half cycle of the power 202 is: the first diode D1, the direct current to direct current converter 110, the load apparatus 30, the second switch S2 and the alternating current power supply apparatus 20. Therefore, the energy consumption of the negative temperature coefficient thermistor 108 and the fourth diode D4 is saved.

The control circuit 106 is configured to turn on the first switch S1 and turn off the second switch S2 in the negative half cycle of the power 202. At this time, the path of the negative half cycle of the power 202 is: the third diode D3, the direct current to direct current converter 110, the load apparatus 30, the first switch S1 and the alternating current power supply apparatus 20. Therefore, the energy consumption of the negative temperature coefficient thermistor 108 and the second diode D2 is saved.

Moreover, in order to avoid the improper operation of the zero cross, the process of after the control circuit 106 receives the power start signal mentioned above can be modified as:

The control circuit 106 is still configured to turn off the first switch S1 in the positive half cycle of the power 202. The control circuit 106 is configured to turn on the second switch S2 when the power 202 is in the positive half cycle and a voltage absolute value of the power 202 is greater than a predetermined voltage value (for examples, 5 volts or 10 volts). The control circuit 106 is still configured to turn off the second switch S2 in the negative half cycle of the power 202. The control circuit 106 is configured to turn on the first switch S1 when the power 202 is in the negative half cycle and the voltage absolute value of the power 202 is greater than the predetermined voltage value. Therefore, the improper operation of the zero cross can be avoided.

However, when the power 202 is in the positive half cycle and the voltage absolute value of the power 202 is not greater than the predetermined voltage value, or when the power 202 is in the negative half cycle and the voltage absolute value of the power 202 is not greater than the predetermined voltage value, the control circuit 106 turns off the first switch S1 and the second switch S2. At this time, the path of the positive half cycle of the power 202 is: the first diode D1, the direct current to direct current converter 110, the load apparatus 30, the negative temperature coefficient thermistor 108, the fourth diode D4 and the alternating current power supply apparatus 20. The path of the negative half cycle of the power 202 is: the third diode D3, the direct current to direct current converter 110, the load apparatus 30, the negative temperature coefficient thermistor 108, the second diode D2 and the alternating current power supply apparatus 20. Comparing to the condition which does not set the predetermined voltage value, the energy of the negative temperature coefficient thermistor 108, the fourth diode D4 and the second diode D2 is wasted. The energy wastage of the fourth diode D4 and the second diode D2 is unavoidable. However, the energy wastage of the negative temperature coefficient thermistor 108 is avoidable through following embodiments.

Figure 2:
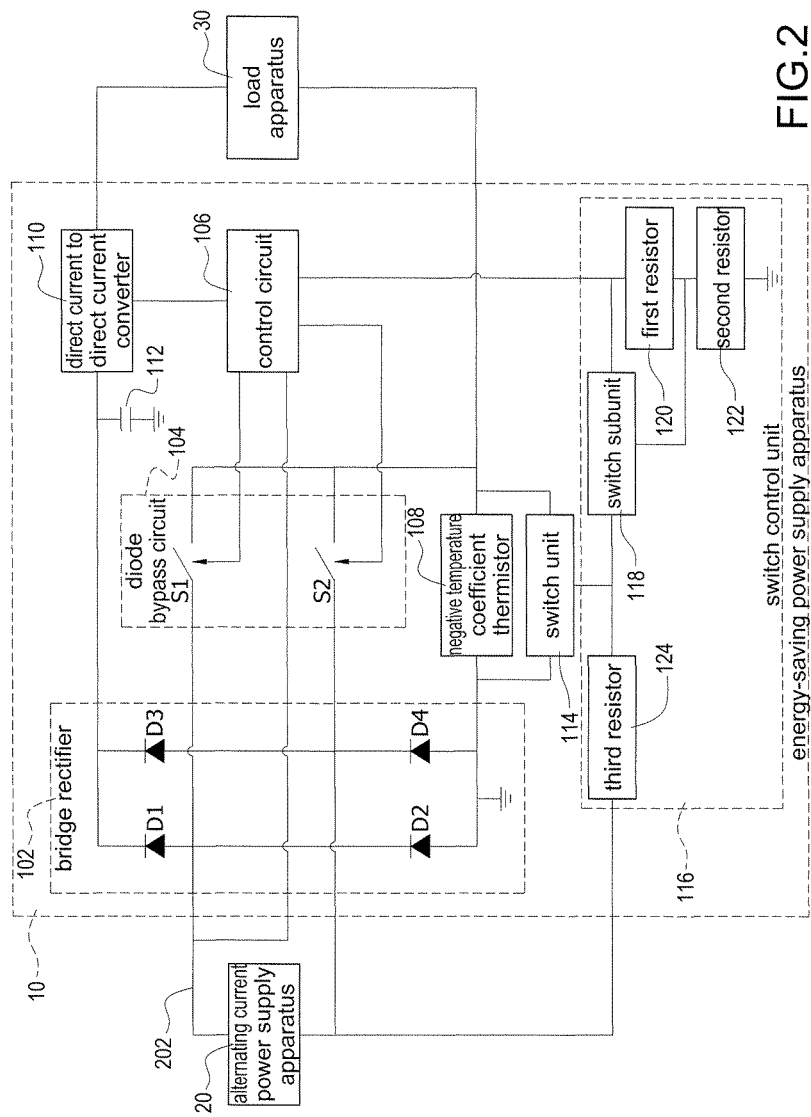
FIG. 2 shows a block diagram of the second embodiment of the energy-saving power supply apparatus of the present invention.

FIG. 2 shows a block diagram of the second embodiment of the energy-saving power supply apparatus of the present invention. The description for the elements shown in FIG. 2, which are similar to those shown in FIG. 1, is not repeated here for brevity. The energy-saving power supply apparatus 10 further comprises a switch unit 114 and a switch control unit 116. The switch control unit 116 comprises a switch subunit 118, a first resistor 120, a second resistor 122 and a third resistor 124.

The switch unit 114 is, for example but not limited to, a transistor switch, for examples, a metal oxide semiconductor field effect transistor or a bipolar junction transistor, wherein the power consumption of the transistor switch is much less than the power consumption of the negative temperature coefficient thermistor 108. The switch subunit 118 is, for example but not limited to, a transistor switch, for examples, a metal oxide semiconductor field effect transistor or a bipolar junction transistor, wherein the power consumption of the transistor switch is much less than the power consumption of the negative temperature coefficient thermistor 108.

The switch unit 114 is electrically connected to the negative temperature coefficient thermistor 108. The switch control unit 116 is electrically connected to the switch unit 114 and the control circuit 106. The switch subunit 118 is electrically connected to the switch unit 114 and the control circuit 106. The first resistor 120 is electrically connected to the switch subunit 118 and the control circuit 106. The second resistor 122 is electrically connected to the switch subunit 118 and the first resistor 120. The third resistor 124 is electrically connected to the switch subunit 118 and the switch unit 114.

When the alternating current power supply apparatus 20 or the load apparatus 30 are just started (the inrush current is easily generated at this time), the first switch S1, the second switch S2 and the switch unit 114 are turned off, so that the power 202 supplied by the alternating current power supply apparatus 20 flows through the negative temperature coefficient thermistor 108 to suppress the inrush current. Because the temperature of the negative temperature coefficient thermistor 108 is low, the impedance of the negative temperature coefficient thermistor 108 is high to suppress the inrush current.

After the control circuit 106 receives the power start signal (no risk of the inrush current at this time):

The control circuit 106 is configured to turn off the first switch S1 in the positive half cycle of the power 202. The control circuit 106 is configured to turn on the second switch S2 when the power 202 is in the positive half cycle and the voltage absolute value of the power 202 is greater than the predetermined voltage value. The control circuit 106 is configured to turn off the second switch S2 in the negative half cycle of the power 202. The control circuit 106 is configured to turn on the first switch S1 when the power 202 is in the negative half cycle and the voltage absolute value of the power 202 is greater than the predetermined voltage value. Therefore, the improper operation of the zero cross can be avoided.

When the power 202 is in the positive half cycle and the voltage absolute value of the power 202 is not greater than the predetermined voltage value, the control circuit 106 turns off the second switch S2 but the control circuit 106 is configured to control the switch control unit 116 to turn on the switch unit 114. The impedance of the switch unit 114 is much less (or less) than the impedance of the negative temperature coefficient thermistor 108, so that the negative temperature coefficient thermistor 108 is bypassed and is almost not conducted. At this time, the path is: the first diode D1, the direct current to direct current converter 110, the load apparatus 30, the switch unit 114, the fourth diode D4 and the alternating current power supply apparatus 20. Comparing to the condition which does not have the switch unit 114 and the switch control unit 116, the energy wastage of the negative temperature coefficient thermistor 108 is saved.

When the power 202 is in the negative half cycle and the voltage absolute value of the power 202 is not greater than the predetermined voltage value, the control circuit 106 turns off the first switch S1 but the control circuit 106 is configured to control the switch control unit 116 to turn on the switch unit 114. The impedance of the switch unit 114 is much less (or less) than the impedance of the negative temperature coefficient thermistor 108, so that the negative temperature coefficient thermistor 108 is bypassed and is almost not conducted. At this time, the path is: the third diode D3, the direct current to direct current converter 110, the load apparatus 30, the switch unit 114, the second diode D2 and the alternating current power supply apparatus 20. Comparing to the condition which does not have the switch unit 114 and the switch control unit 116, the energy wastage of the negative temperature coefficient thermistor 108 is saved.

The advantage of the present invention is that after the control circuit 106 receives the power start signal (no risk of the inrush current at this time), the control circuit 106 is configured to control the diode bypass circuit 104, so that a part of the diodes of the bridge rectifier 102 are bypassed to save energy. At this time, the negative temperature coefficient thermistor 108 is also bypassed to save energy. Moreover, even if the predetermined voltage value is set for avoiding the improper operation of the zero cross, the present invention can bypass the negative temperature coefficient thermistor 108 to save energy when the voltage absolute value of the power 202 is not greater than the predetermined voltage value.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An energy-saving power supply apparatus comprising:
a bridge rectifier;
a diode bypass circuit electrically connected to the bridge rectifier;
a control circuit electrically connected to the diode bypass circuit and the bridge rectifier; and
a negative temperature coefficient thermistor electrically connected to the diode bypass circuit and the bridge rectifier,
wherein after the control circuit receives a power start signal, the control circuit is configured to control the diode bypass circuit;
wherein the bridge rectifier comprises:
a first diode electrically connected to the diode bypass circuit and the control circuit; and
a second diode electrically connected to the first diode,
wherein the diode bypass circuit comprises:
a first switch electrically connected to the bridge rectifier and the control circuit,
wherein when a power is in a first polarity cycle and a voltage absolute value of the power is not greater than a predetermined voltage value, the control circuit is configured to turn off the first switch, so that a path of the power is: the first diode, a load apparatus, the negative temperature coefficient thermistor, the second diode and an alternating current power supply apparatus;
wherein when the power is in the first polarity cycle and the voltage absolute value of the power is greater than the predetermined voltage value, the control circuit is configured to turn on the first switch, so that the path of the power is: the first diode, the load apparatus, the first switch and the alternating current power supply apparatus.

2. The energy-saving power supply apparatus in claim 1, further comprising:
a direct current to direct current converter electrically connected to the bridge rectifier and the control circuit.

3. The energy-saving power supply apparatus in claim 2, further comprising:
a filtering capacitor electrically connected to the bridge rectifier and the direct current to direct current converter.

4. An energy-saving power supply apparatus comprising:
a bridge rectifier;
a diode bypass circuit electrically connected to the bridge rectifier;
a control circuit electrically connected to the diode bypass circuit and the bridge rectifier;
a negative temperature coefficient thermistor electrically connected to the diode bypass circuit and the bridge rectifier;
a switch unit electrically connected to the negative temperature coefficient thermistor; and
a switch control unit electrically connected to the switch unit and the control circuit,
wherein after the control circuit receives a power start signal, the control circuit is configured to control the diode bypass circuit;
wherein the bridge rectifier comprises:
a first diode electrically connected to the diode bypass circuit and the control circuit; and
a second diode electrically connected to the first diode,
wherein the diode bypass circuit comprises:
a first switch electrically connected to the bridge rectifier and the control circuit,
wherein when a power is in a first polarity cycle and a voltage absolute value of the power is not greater than a predetermined voltage value, the control circuit is configured to turn off the first switch, and the switch control unit is configured to turn on the switch unit, so that a path of the power is: the first diode, a load apparatus, the switch unit, the second diode and an alternating current power supply apparatus;
wherein when the power is in the first polarity cycle and the voltage absolute value of the power is greater than the predetermined voltage value, the control circuit is configured to turn on the first switch, so that the path of the power is: the first diode, the load apparatus, the first switch and the alternating current power supply apparatus.

5. The energy-saving power supply apparatus in claim 4, wherein the switch control unit comprises:
- a switch subunit electrically connected to the switch unit and the control circuit;
- a first resistor electrically connected to the switch subunit and the control circuit;
- a second resistor electrically connected to the switch subunit and the first resistor; and
- a third resistor electrically connected to the switch subunit and the switch unit.

6. The energy-saving power supply apparatus in claim 5, further comprising:
- a direct current to direct current converter electrically connected to the bridge rectifier and the control circuit.

7. The energy-saving power supply apparatus in claim 6, further comprising:
- a filtering capacitor electrically connected to the bridge rectifier and the direct current to direct current converter.

\* \* \* \* \*